(12) United States Patent
Meyer et al.

(10) Patent No.: US 7,099,622 B2
(45) Date of Patent: Aug. 29, 2006

(54) CONTROLLING CHANNEL SWITCHING IN A UMTS NETWORK

(75) Inventors: Michael Meyer, Aachen (DE); Joachim Sachs, Aachen (DE); Stefan Wager, Espoo (FI); Reijo Matinmikko, Espoo (FI); Toomas Wigell, Espoo (FI); Janne Peisa, Espoo (FI); Edwin Van Der Pol, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 578 days.

(21) Appl. No.: 10/399,251

(22) PCT Filed: Oct. 29, 2001

(86) PCT No.: PCT/EP01/12586

§ 371 (c)(1),
(2), (4) Date: Jul. 17, 2003

(87) PCT Pub. No.: WO02/43413

PCT Pub. Date: May 30, 2002

(65) Prior Publication Data

US 2004/0097191 A1    May 20, 2004

(30) Foreign Application Priority Data

Nov. 21, 2000 (GB) .................................. 0028314.3

(51) Int. Cl.
*H04B 7/15* (2006.01)

(52) U.S. Cl. .................. 455/11.1; 455/3.04; 455/13.1; 455/428; 455/439; 455/63.3; 370/299; 370/329; 370/352; 370/353

(58) Field of Classification Search ............... 455/11.1, 455/13.1, 3.04, 428, 439, 63.3; 370/299, 370/329, 352, 353
See application file for complete search history.

(56) References Cited

FOREIGN PATENT DOCUMENTS

| WO | WO 96/37079 | 11/1996 |
|----|-------------|---------|
| WO | WO 99/52307 | 10/1999 |
| WO | WO 99/66748 | 12/1999 |
| WO | WO 01/31948 | 5/2001 |
| WO | WO 01/31950 | 5/2001 |

*Primary Examiner*—Matthew Anderson
*Assistant Examiner*—Sanh Phu
(74) *Attorney, Agent, or Firm*—Nixon & Vanderhye P.C.

(57) ABSTRACT

In a UMTS Terrestrial Radio Access Network (UTRAN), a method of switching from a current common channel to a dedicated channel for a UE. The method comprises estimating the round trip delay for data packets travelling between the UE and a peer node with which the UE is communicating. The product of the estimated round trip delay and the bandwidth of the common channel or the dedicated channel is determined and a threshold defined on the basis of that product. A switch from the common channel to a dedicated channel is initiated when the fill level of the RLC buffer(s) in the UTRAN for the UE reaches or exceeds said threshold.

11 Claims, 4 Drawing Sheets

CONTROLLING CHANNEL SWITCHING IN A UMTS NETWORK

This application is the US national phase of international application PCT/EP01/12586 filed 29 Oct. 2001 which designated the U.S.

FIELD OF THE INVENTION

The present invention relates to channel switching in a Universal Mobile Telecommunications System (UMTS) network and more particularly to controlling channel switching to optimise the use of transmission resources.

BACKGROUND OF THE INVENTION

The European Telecommunications Standardisation Institute (ETSI) is currently in the process of standardising a new set of protocols for mobile telecommunications systems. The set of protocols is known collectively as Universal Mobile Telecommunications System (UMTS).

FIG. 1 illustrates schematically a UMTS network 1 which comprises a core network 2 and a UMTS Terrestrial Radio Access Network (UTRAN) 3. The UTRAN 3 comprises a number of Radio Network Controllers (RNCs) 4, each of which is coupled to a set of neighbouring Base Transceiver Stations (BTSs) 5. BTSs are sometimes referred to as Node Bs. Each Node B 5 is responsible for a given geographical cell and the controlling RNC 4 is responsible for routing user and signalling data between that Node B 5 and the core network 2. All of the RNCs are coupled to one another. A general outline of the UTRAN 3 is given in Technical Specification TS 25.401 V3.2.0 of the 3rd Generation Partnership Project. FIG. 1 also illustrates a mobile terminal or User Equipment (UE) 6, a Serving GPRS Support Node (SGSN) 7 and a GPRS Gateway Support Node (GGSN) 8. The SGSN 7 and the GGSN 8 provide packet switched data services to the UE 6 via the UTRAN (with the GGSN being coupled to the Internet).

User data received at an RNC from the UTRAN core network is stored at a Radio Link Control (RLC) entity in one or more RLC buffers. User data generated at a UE is stored in RLC buffers of a peer RLC entity at the UE. User data (extracted from the RLC buffers) and signalling data is carried between an RNC and a UE using Radio Access Bearers (RABs). Typically, a UE is allocated one or more Radio Access Bearers (RABs) each of which is capable of carrying a flow of user or signalling data. RABs are mapped onto respective logical channels. At the Media Access Control (MAC) layer, a set of logical channels is mapped in turn onto a transport channel, of which there are three types:

- a common transport channel which is shared by many different mobile terminals and which may extend in either the uplink or the downlink direction (one type of common channel is a Forward Access CHannel (FACH));
- a "dedicated" transport channel (DCH) which is allocated to a single mobile terminal—DCHs are allocated in pairs of uplink and downlink channels; and
- a downlink shared channel (DSCH) which is mapped to a small number of mobile terminals.

Several transport channels are in turn mapped at the physical layer onto one or more physical channels (e.g. S-CCPCH or DPCH) for transmission over the air interface between a Node B and a UE.

FIG. 2 illustrates certain of the layers present at a UE, a Node B, and an RNC of a UMTS network. In particular, FIG. 2 illustrates that the MAC layer, present at the RNC and the UE, is split into a MAC-c layer and a MAC-d layer. UTRAN provides UEs with an "always on" connection. During periods of low activity, when perhaps only signalling information (or low level data transfer) is being exchanged between the UE and the network, the UE is allocated a common channel. However, following an increase in data volume, the network may decide to switch the connection from a common channel to a dedicated channel (and a downlink shared channel). For example, a decision may be made to switch from a FACH/RACH channel to a DCH. The decision to switch is made by the Radio Resource Manager (RRM) entity of the RNC.

It is envisaged that UMTS networks will to a large extent be used for carrying data traffic (and using the services of a SGSN and a GGSN). Most current applications which make use of packet switched data services use the Transport Control Protocol (TCP) in conjunction with Internet Protocol (IP)-TCP is used to provide a (connection-oriented) reliable service over the unreliable IP service. It can therefore be expected that the majority of data communications across a UMTS network will use TCP/IP.

When a TCP connection between peer hosts is initiated, TCP starts transmitting data at a relatively low rate. The transmission rate is slowly increased in order to avoid causing an overflow at routers of the IP network (which would result in the loss of packets and the need to resend these lost packets). The rate at which data can be transmitted is defined by two variables, cwnd and ssthresh.

The variable cwnd defines the number of data packets which the TCP sender can transmit before acknowledgement messages have been received from the TCP receiver for the previously sent block of cwnd data packets. As each acknowledgement is received for segments of that last block, a segment of the new block is sent. At the beginning of a communication, cwnd is set at a low value (e.g. 1 segment=512 bytes) and the system is in a "slow start" mode. Following receipt of the first acknowledgement from the receiver, cwnd is increased in size by 1 segment (to 2 segments). This is repeated following each acknowledgement for a packet (or for a small number of packets), resulting in an exponential opening of the congestion window. The variable ssthresh is initially set to some fixed level (e.g. 65535 bytes), and the slow start mode continues until cwnd>ssthresh. Thereafter, a "congestion avoidance" mode is entered during which cwnd is increased by just 1/cwnd each time a successful transmission acknowledgement is received. The variable cwnd has an upper limit defined either by the sender or by an advertisement message sent from the receiver.

If congestion occurs, indicated by a timeout (of a controlling timer at the sender) or by receipt of duplicate acknowledgements by the sender, ssthresh is set to one half of the previous value of cwnd. In the event that congestion was indicated by a timeout, cwnd is set to 1 whilst, in the event that congestion was indicated by a duplicate acknowledgement, cwnd remains unchanged. Thus, the slow start mode is continued until such time as the transmission rate (defined by cwnd) reaches half the rate which last caused congestion to occur. Thereafter, the congestion avoidance mode is entered.

Further background information on TCP/IP can be obtained from Stevens, "TCP/IP Illustrated", Vol. 1.

STATEMENT OF THE INVENTION

A TCP sender is only able to take full advantage of a transmission channel in the UTRAN when the congestion window cwnd is equal to (or exceeds) the product of the bandwidth of the transmission channel and the round trip transmission delay between itself and the peer TCP node.

It has been recognised by the present inventors, that when using TCP/IP based data transmission over a UMTS network, the congestion avoidance mechanism used by TCP will result in the sender not being able immediately to take advantage of a switch from a common channel to a dedicated channel in the UTRAN of the network, if that switch occurs at too early a stage in the TCP/IP communication and before sufficient acknowledgements have been received by the sender (and the value of cwnd has reached the bandwidth delay product). The result will be that resources on a dedicated channel allocated to a particular UE will remain unused for a short period of time. This represents an inefficient use of UTRAN resources and a serious problem for network operators, especially where the number of CDMA spreading codes available to an operator is limited.

It is an object of the present invention to overcome or at least mitigate the above noted disadvantages of existing channel switching mechanisms in the UTRAN. This and other objects are achieved at least in part by initiating a switch from a common channel to a dedicated for a given UE, only when the fill level of the RLC buffer(s) for that UE reaches or exceeds the bandwidth delay product of the common channel.

According to a first aspect of the present invention there is provided in a UMTS Terrestrial Radio Access Network (UTRAN) a method of switching from a current common channel to a dedicated channel for a UE, the method comprising:

estimating the round trip delay for data packets travelling between the UE and a peer node with which the UE is communicating;

determining the product of the estimated round trip delay and the bandwidth of the common channel or the dedicated channel; and defining a threshold on the basis of said product, and initiating a switch from the common channel to a dedicated channel when the fill level of the RLC buffer(s) for the UE in the UTRAN or the UE reaches or exceeds said threshold.

Embodiments of the invention seek to optimise the point in time when the channel switch occurs, in order to avoid switching before the UE or peer node are able to take advantage of the increased bandwidth afforded by the dedicated channel.

The present invention may be used to control channel switching both in the uplink and the downlink direction. In the former case, the fill level of the RLC buffer(s) in the UE is used to initiate a channel switch, whilst in the latter case, the fill level of the RLC buffer(s) in the UTRAN are used to initiate a channel switch.

The bandwidth of the common channel used to calculate said product may be the whole bandwidth of the common channel available to the UTRAN, or may be that portion of the common channel bandwidth available to the UE.

The round trip delay may be estimated by the RRM of the RNC based upon a knowledge of the transmission delay between the RNC and the UE. This parameter may be measured by the RNC during registration of the UE with the network and/or may be dynamically updated.

In certain embodiments of the invention, said threshold is defined as the product of the estimated round trip delay and the bandwidth of the common channel. Thus, the switch is initiated substantially at that time when the congestion window (cwnd) for the transmitter reaches or exceeds the bandwidth delay product of the common channel. Preferably, the common channel bandwidth is measured during the setting up of the RNC. This bandwidth depends on several factors including the broadcast power of the channel.

In other embodiments of the invention, said threshold is defined as the product of the round trip delay and the bandwidth of the dedicated channel. Thus, the switch is initiated substantially at that time when the congestion window (cwnd) for the transmitter reaches or exceeds the bandwidth delay product of the dedicated channel.

In still other embodiments of the invention, said threshold may be derived from either the product of the round trip delay and the bandwidth of the dedicated channel or the product of the round trip delay and the bandwidth of the common channel using a predefined algorithm.

Where the switch has been made from a common channel to a dedicated channel (DCH), a decision upon whether or not to additionally allocate a downlink shared channel may be made when the RLC buffer fill level reaches or exceeds the bandwidth delay product for the dedicated channel, or sum of the bandwidth delay product of the dedicated channel and the bandwidth delay product of the downlink shared channel. The similar process may be carried out to determine whether or not the bandwidth of the DCH and/or DSCH should be increased. Using the invention, it is possible to provide a stepwise increase in available bandwidth (e.g. common to 64 kbps to 128 kbps to 384 kbps).

Where a UE has two or more buffers allocated to it, the fill level is determined by adding together each of the individual fill levels.

According to a second aspect of the present invention there is provided a Radio Network Controller for use in the UTRAN of a UMTS network, the RNC comprising:

means for initiating a switch from a common channel to a dedicated channel for a UE;

first processing means for estimating the round trip delay for transmissions between a UE and a peer node; and second processing means for determining the product of the estimated round trip delay and the bandwidth of the common channel or the dedicated channel and for defining a threshold on the basis of said product, wherein said means for initiating a switch from the common channel to a dedicated channel initiates the switch when the fill level for the UE of the RLC buffer(s) in the UTRAN or the UE reaches or exceeds said threshold.

According to a third aspect of the present invention there is provided in a UMTS Terrestrial Radio Access Network (UTRAN) a method of allocating CCH, DCH and DSCH resources to a UE, the method comprising the steps of estimating the round trip delay for data packets travelling between the UE and a peer node with which the UE is communicating;

defining a set of thresholds on the basis of the respective products of the estimated round trip delay and the bandwidths available to the UE using the CCH, DCH, and DSCH; and initiating a change in resource allocation when the fill level of the RLC buffer(s) for the UE in the UTRAN or the UE crosses said threshold.

According to a fourth aspect of the present invention there is provided in a UMTS Terrestrial Radio Access Network (UTRAN) a method of switching from a current dedicated channel to a common channel for a UE, the method comprising:
- estimating the round trip delay for data packets travelling between the UE and a peer node with which the UE is communicating;
- determining the product of the estimated round trip delay and the bandwidth of the common channel or the dedicated channel; and
- defining a threshold on the basis of said product, and initiating a switch from the dedicated channel to a common channel when the fill level of the RLC buffer(s) in the UTRAN for the UE reaches or falls below said threshold.

Preferably, following the initiation of said switch from the first channel to the second channel, the switch is only completed after the expiry of a timer and providing that the buffer fill level has not risen above the threshold prior to expiry of the timer.

DETAILED DESCRIPTION OF A PREFERRED EMBODIMENT

Figure 1:
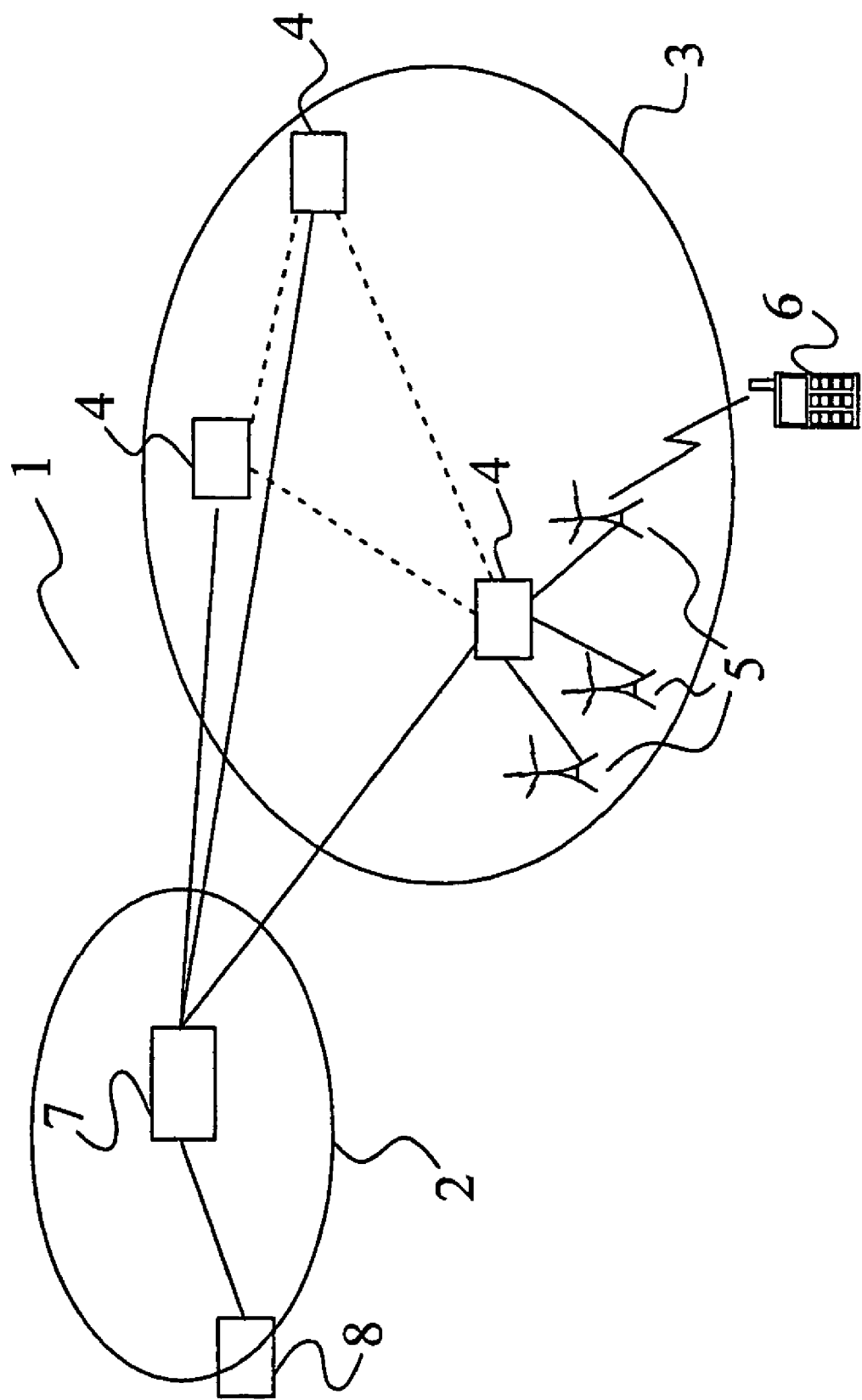
FIG. 1 illustrates schematically a UMTS network comprising a core network and a UTRAN.

The general structure of a UMTS network has been described above with reference to the schematic drawing of FIG. 1. Protocol models for the FACH transport channel have also been described with reference to FIG. 2.

Figure 2:
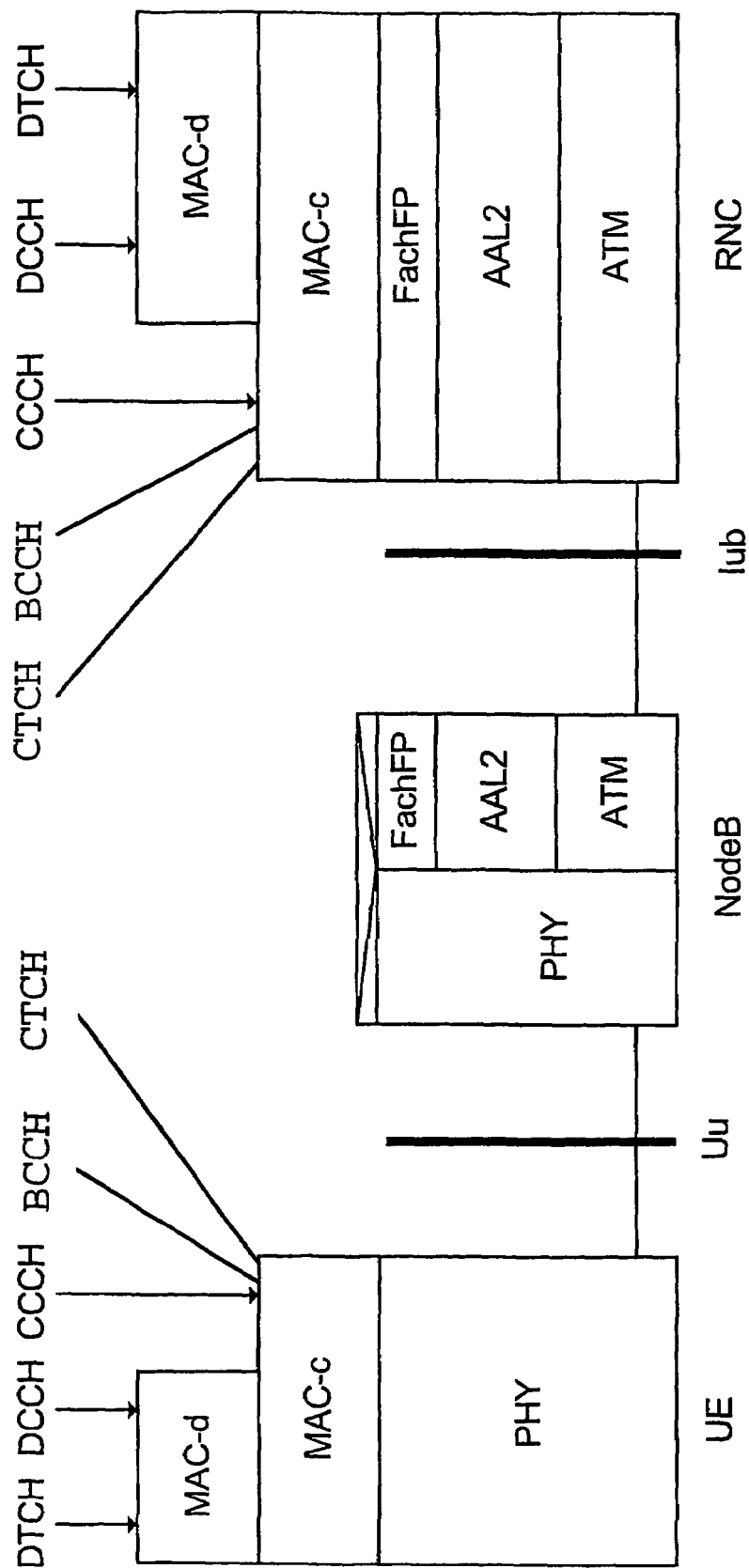
FIG. 2 illustrates the protocol architecture for a FACH transport channel of the UTRAN of FIG. 1.
Figure 3:
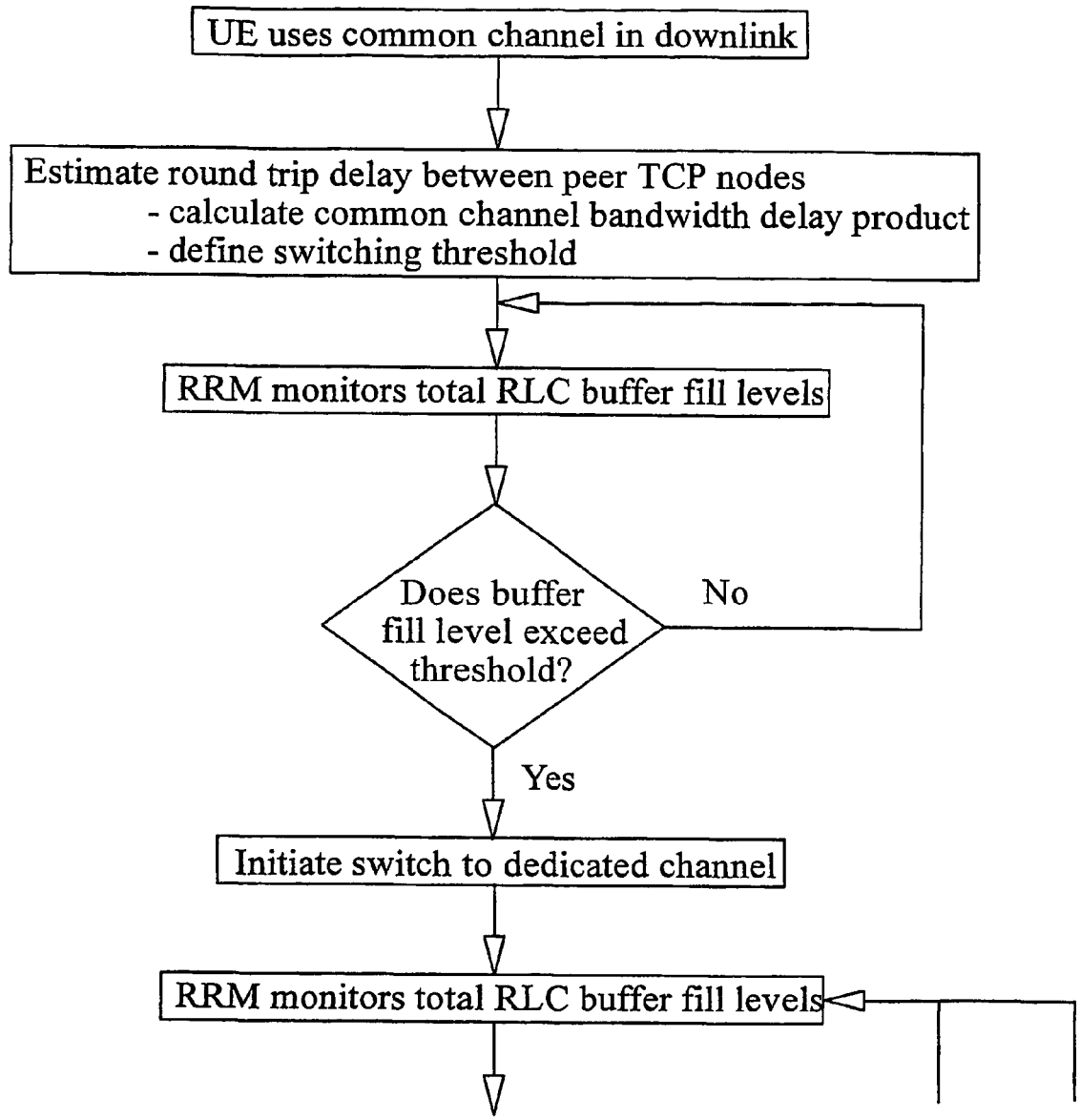
FIG. 3 is a flow diagram illustrating a process for switching from a common to a dedicated transport channel in the UTRAN of FIG. 1.
Figure 3:
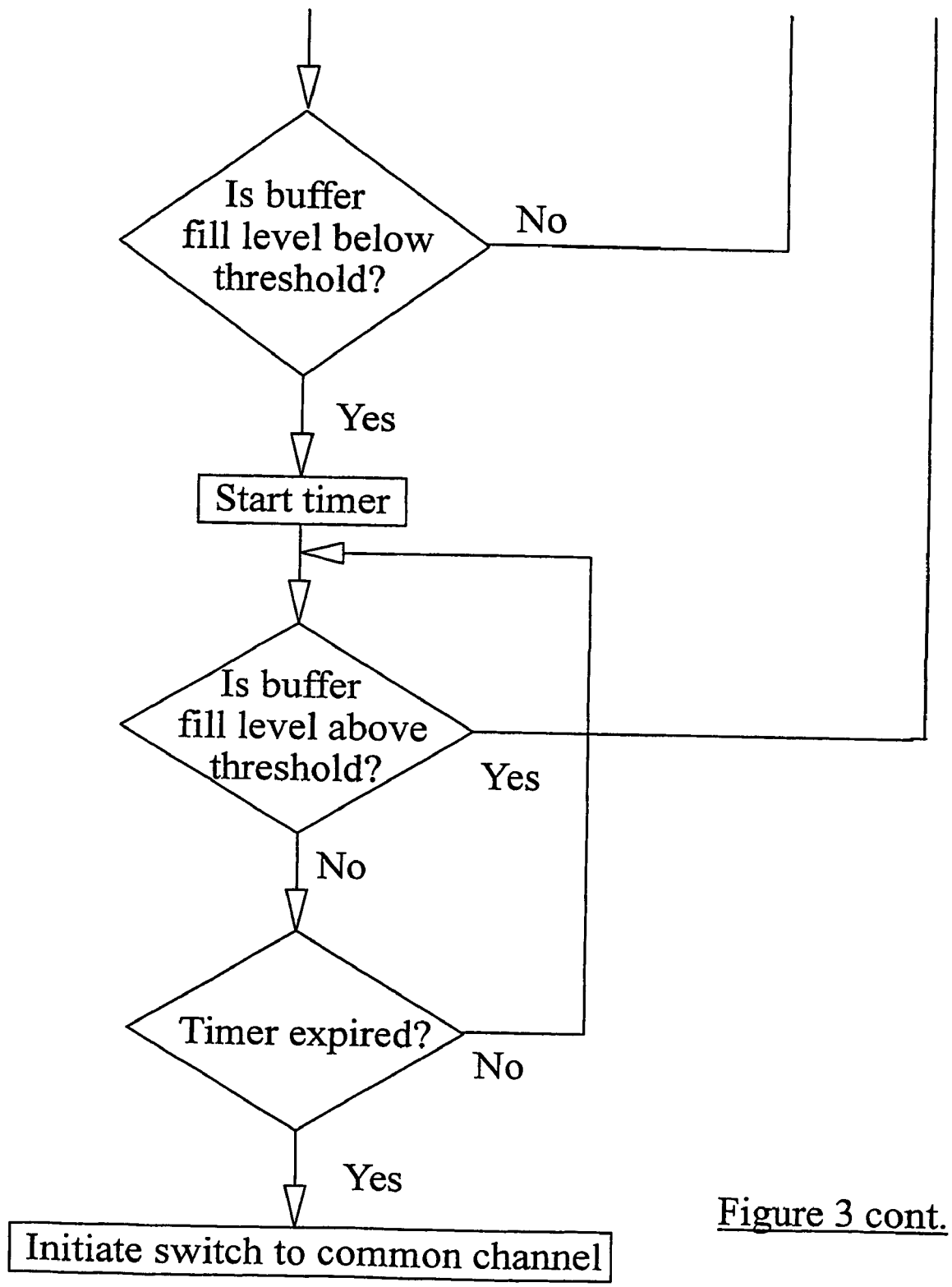

Considering the scenario illustrated in FIG. 2, and considering the transfer of data in the downlink direction, signalling and user data packets (e.g. IP packets) destined for the UE are passed, via a PDCP entity, to the Radio Link Control (RLC) entity. The RLC is responsible for the segmentation of packets (as well as for certain error correction and ciphering functions), and generates RLC Packet Data Units (PDUs) which are passed to the MAC layer and received as MAC Service Data Units (SDUs). The MAC-d entity schedules the packets for transmission.

Where a UE has been allocated a dedicated channel (DCH) or downlink shared channel (DSCH), the MAC-d PDUs are passed to the Node B for transmission over the air interface. However, where the UE has been allocated a common channel, the MAC-d PDUs are passed to a MAC-c entity and are received thereby as MAC-c SDUs. The MAC-c entity schedules MAC-c PDUs for transmission on the common channel. This second scenario is the scenario illustrated in FIG. 2.

For a common channel (FACH), the data transmission rate (bandwidth) of that channel is perhaps 32 kbps. A typical round trip delay between the GGSN and the UE is 200 ms. The bandwidth delay product for the common channel is therefore 6.4 kbits=800 bytes. Thus, in order to fully utilise the common channel the congestion window cwnd should have a size of at least 800 bytes. A typical TCP segment is 512 bytes which means that the TCP sender can fully utilise the common channel after it has received a first acknowledgement (and cwnd has been increased to 2 segments or 1024), i.e. after one round trip delay or 0.2 seconds.

For a dedicated channel (which is not shared by two or more UEs), the data rate may be 384 kbps. Assuming again a 200 ms round trip delay, the bandwidth delay product for the dedicated channel is 9.6 kbytes. This means that the TCP sender cannot fully utilise the dedicated channel until the congestion window cwnd has a size of 9.6 kbytes. Typically it takes 2 to 3 seconds to open the congestion window up to this size.

For the purpose of the following discussion, a data exchange between a UE and a peer node (or correspondent host) is assumed. Data segments sent by the (remote) TCP sender to its peer TCP node (e.g. the UE) are received by the serving RNC and are temporarily placed in one or more RLC buffers. Data is taken from the buffers on a first in first out basis for transmission over a common channel. In order to efficiently use traffic channel resources, the Radio Resource Manager (RRM) of the RNC defines a buffer fill threshold level at which a switch will be made from a common channel to a dedicated channel. When the sum of all of the data in the buffers exceeds this threshold, a switch is initiated. In a typical scenario, the UE sends a www download request to the peer node using a common channel. The peer node accesses the requested page and begins sending the data to the UE. As a large volume of data is involved, a switch from a common channel to a dedicated channel is desirable.

In a first embodiment of the present invention, the threshold level is equal to the product of the common channel bandwidth and the approximate round trip delay between the UE and the peer node. The common channel bandwidth is a fixed value which depends on the set up of the UTRAN. For example, the bandwidth is dependent upon the transmission power. This bandwidth is therefore calculated during the set up procedure and is stored in a memory of the RNC. The round trip delay depends however on factors which can vary between mobiles and over time. This delay is therefore UE specific and should therefore be calculated each time a connection is initiated by a UE, and may be updated periodically thereafter. An estimate of the round trip delay can be made based upon the round trip delay between the RNC and the UE (using proportionality). Assuming the accuracy of the estimates, and using the example data given above, the switch from the common to the dedicated channel will be made when the sum of the buffer fill levels equals or exceeds 800 bytes. The necessary processing to calculate the bandwidth delay product is carried out by the RRM.

In a second embodiment of the invention, the threshold level is equal to the product of the bandwidth of the dedicated channel and the estimated round trip delay. As the bandwidth of the dedicated channel is generally fixed in UMTS (subject however to TCH reconfiguration and or TFCI limitation), this is invariant. However, as with the first embodiment the delay must be calculated on a UE by UE basis, and on a per connection basis. Again, using the example given above, the switch to the dedicated channel will occur when the sum of the buffer fill levels reaches or exceeds 9.6 kbytes.

The embodiments described above will initiate a channel switch when the congestion window cwnd is equal to or greater than the common or dedicated channel bandwidth delay product, assuming that there is no backlog of unsent data in the RLC buffers when a fresh batch of data (of size cwnd) is sent from the TCP sender to the RNC. In the event that there is a backlog of data, the switch may occur before cwnd reaches the relevant product. However, as a backlog in the RLC buffers is indicative of the need for more bandwidth, a switch at this point in time is still appropriate.

It will be appreciated by the person of skill in the art that various modifications may be made to the above described embodiments without departing from the scope of the present invention. For example, whilst the switch from a common channel to a dedicated channel may be triggered by the fill level of the RLC buffers exceeding the threshold value, the switch may only be completed upon expiry of a timer and in the event that in the intervening time period the buffer fill levels has not fallen below the threshold. This may be appropriate during periods of high load. In another modification, the channel switching mechanism may interact with existing Radio Resource Management in order to delay switching if that represents and optimal use of the overall transmission resources. Certain Radio Resource Management data may be used to determine the switching threshold, in combination with bandwidth delay product.

A "downswitch" back from a dedicated channel to a common channel may be controlled using a similar mechanism to that described above, with the switch being initiated when the RLC buffer fill levels has fallen below the chosen bandwidth for some predefined period of time measured using a timer.

The invention claimed is:

1. In a UMTS Terrestrial Radio Access Network (UTRAN) a method of switching from a current common channel to a dedicated channel for a UE, the method comprising:
    estimating the round trip delay for data packets traveling between the UE and a peer node with which the UE is communicating;
    determining the product of the estimated round trip delay and the bandwidth of the common channel or the dedicated channel; and
    defining a threshold on the basis of said product, and initiating a switch from the common channel to a dedicated channel when the fill level of the RLC buffer(s) for the UE in the UTRAN or the UE reaches or exceeds said threshold.

2. A method according to claim 1 wherein said switch relates to either the uplink or the downlink direction and, in the former case, the fill level of the RLC buffer(s) in the UE is used to initiate a channel switch, whilst in the latter case, the fill level of the RLC buffer(s) in the UTRAN as used to initiate a channel switch.

3. A method according to claim 1, wherein the round trip delay is estimated by the RNC based upon a knowledge of the transmission delay between the RNC end the UE.

4. A method according to claim 1, wherein said threshold is defined as the product of the estimated round trip delay and the bandwidth of the common channel.

5. A method according to claim 1, wherein said threshold is defined as the product of the round trip delay and the bandwidth of the dedicated channel.

6. A method according to claim 1, wherein said threshold is derived from either the product of the round trip delay and the bandwidth of the dedicated channel or the product of the round trip delay and the bandwidth of the common channel using a predefined algorithm.

7. A method according to claim 1, wherein after a switch has been made from a common channel to a dedicated channel (DCH), a decision upon whether or not to additionally allocate a downlink shared channel is made when the RLC buffer fill level reaches or exceeds the bandwidth delay product for the dedicated channel, or the sum of the bandwidth delay product of the dedicated channel and the bandwidth delay product of the downlink shared channel.

8. A Radio Network Controller for use in the UTRAN of a UMTS network, the RNC comnprising:
    means for initiating a switch from a common channel to a dedicated channel for a UE;
    first processing means for estimating the round trip delay for transmissions between a UE and a peer node; and
    second processing means for determining the product of the estimated round trip delay and the bandwidth of the common channel or the dedicated channel and for defining a threshold on the basis of said product,
    wherein said means for initiating a switch from the common channel to a dedicated channel initiates the switch when the fill level for the UE of the RLC buffer(s) in the UTRAN or the UE reaches or exceeds said threshold.

9. In a UMTS Terrestrial Radio Access Network (UTRAN) a method of allocating CCH, DCH and DSCH resources to a UE, the method comprising the stops of
    estimating the round trip delay for data packets travelling between the UE and a peer node with which the UE is communicating;
    defining a said thresholds on the basis of the respective products of the estimated round hip delay and the bandwidths available to the UE using the CCH, DCH, and DSCH; and
    initiating a change in resource allocation when the fill level at the RLC buffer(s) for the UE in the UTRAN or the US crosses said threshold.

10. In a UMTS Terrestrial Radio Access Network (UTRAN) a method of switching from a current dedicated channel to a common channel for a UE, the method comprising:
    estimating the round trip delay for data packets travelling between the US and a peer node with which the US is communicating;
    determining the product of the estimated round trip delay and the bandwidth of the common channel or the dedicated channel; and
    defining a threshold on the basis of said product, and initiating a switch from the dedicated channel to a common channel when the fill level of the RLC buffer(s) in the UTRAN for the UE reaches or falls below said threshold.

11. A method according to claim 10, wherein, following the initiation of said switch from the dedicated channel to the common channel, the switch is only completed alter the expiry of a timer and providing that the buffer fill level has not risen above the threshold prior to expiry of the timer.

* * * * *